United States Patent [19]

Martin

[11] 4,115,087

[45] Sep. 19, 1978

[54] OPTICAL FIBRES

[75] Inventor: David Joseph Martin, London, England

[73] Assignee: BICC Limited, London, England

[21] Appl. No.: 784,732

[22] Filed: Apr. 5, 1977

[30] Foreign Application Priority Data

Apr. 7, 1976 [GB] United Kingdom ............... 14108/76

[51] Int. Cl.² .......................... B05D 1/40; G02B 5/14; G02B 1/10
[52] U.S. Cl. ...................................... 65/3 C; 65/3 A; 427/160; 427/163; 427/211
[58] Field of Search .................. 427/160, 163, 434 D, 427/175, 211; 65/3 A, 3 C

[56] References Cited

U.S. PATENT DOCUMENTS

| | | | |
|---|---|---|---|
| 2,929,738 | 3/1960 | Bateson et al. | 427/434 D X |
| 3,511,680 | 5/1970 | Marcell et al. | 427/211 X |
| 3,993,805 | 11/1976 | Roberts | 427/211 X |

*Primary Examiner*—James R. Hoffman
*Attorney, Agent, or Firm*—Buell, Blenko & Ziesenheim

[57] ABSTRACT

A continuous coating of hardenable material, e.g. a thermosetting enamel, is applied to an advancing optical fibre by causing the fibre to pass between two continuously moving endless surfaces, e.g. two rollers, which are positioned on opposite sides of the advancing fibre and each of which carries a layer of liquefied hardenable material in such a way that the advancing fibre is at least partially immersed in each of said layers, the distance that each endless surface is spaced from the advancing optical fibre and the thickness of the layer of hardenable material on each endless surface being such that opposite parts of the advancing fibre pass through said layers of hardenable material with substantially no physical contact taking place between the fibre and the endless sufaces themselves. The endless surfaces are driven in such a direction and at such a speed having regard to the direction and speed of the advancing fibre that liquefied hardenable material is transferred from the moving endless surfaces to the advancing fibre to form on the fibre a continuous coating of substantially uniform thickness.

8 Claims, 5 Drawing Figures

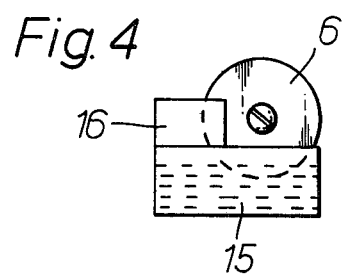
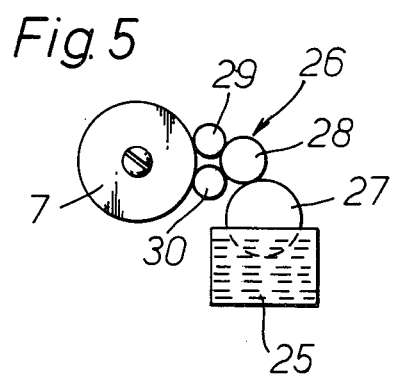

OPTICAL FIBRES

This invention relates to optical fibres for use in optical guides for the transmission of the ultra-violet, visible and infra-red regions of the electromagnetic spectrum, which regions, for convenience, will hereinafter all be included in the generic term "light", and especially, but not exclusively, to optical fibres for use in optical waveguides to be employed in the communication field adapted for transmission of light having a wavelength within the range 0.8 to 1.3 $\mu$m.

Such optical fibres may be of glass or other transparent material whose refractive index is arranged to decrease over at least a part of the radius of the fibre in a direction towards the outer surface of the fibre or they may be of composite form comprising a core of transparent material clad throughout its length with another transparent material of lower refractive index, which, by total internal refraction of light being transmitted along the fibre, confines at least a major proportion of the light within the core. A composite optical fibre is generally, but not necessarily, made of two glasses of different refractive indices, the glass forming the core having a higher refractive index than the glass forming the cladding; the refractive index of the glass of the core may gradually decrease towards the outer surface of the core over at least a part of the distance between the central axis of the core and its outer surface. In an alternative form of composite fibre the core may be made of a transparent liquid having a higher refractive index than that of the cladding. All such optical fibres generally, but not necessarily, have diameters lying in the range 100 to 150 $\mu$m. They are usually of substantially circular cross-section but, in some circumstances, they may be of non-circular cross-section.

During manufacture of an optical fibre and of an optical guide of which an optical fibre forms a component part, there is a risk that the surface of the optical fibre will be damaged to such an extent that the tensile strength of the fibre is substantially reduced. With a view to protecting an optical fibre from damage caused by mechanical contact with other bodies and by the atmosphere it has been proposed to provide the optical fibre with a continuous abrasion-resistant coating of a hardened material as soon as possible after the optical fibre has been formed. The thickness of an abrasion-resistant coating generally lies in the approximate range 1 to 10 $\mu$m, but it can be as high as 50 $\mu$m. It has also been proposed to protect an optical fibre against axial bends or other distortions caused by lateral forces, which distortions result in an increase in attenuation, by providing the optical fibre with a continuous coating of a suitable buffer material, which material may be a hardened or a soft material. The thickness of a buffer coating generally lies in the approximate range 50 to 500 $\mu$m. It is desirable that the hardenable material of an abrasion-resistant coating be applied as soon as possible after formation of an optical fibre. It is also desirable that the material sets or otherwise hardens rapidly and that the resultant coating is of substantially uniform thickness at any transverse cross-section of the coated optical fibre. Methods, eminently suitable for applying a coating of uniform thickness to an advancing wire, have been employed or proposed to provide an advancing optical fibre with a coating of a hardened material but such methods present difficulties.

It is an object of the present invention to provide a method of applying a continuous coating of hardenable material to an advancing optical fibre, which coating is of substantially uniform thickness at any transverse cross-section of the coated fibre. It is a further object of the invention to provide apparatus for this purpose.

According to the invention, the method comprises causing an optical fibre advancing in the direction of its length to pass between two continuously moving endless surfaces which are positioned on opposite sides of the advancing fibre and each of which carries a layer of hardenable material in a liquid or semi-liquid state in such a way that the advancing optical fibre is at least partially immersed in each of said layers the distance that each endless surface is spaced from the advancing optical fibre and the thickness of the layer of hardenable material on each endless surface being such that opposite parts of the advancing fibre pass through said layers of hardenable material with substantially no physical contact taking place between the fibre and the endless surfaces themselves; and driving the endless surfaces in such a direction and at such a speed having regard to the direction and speed of the advancing optical fibre that hardenable material in a liquid or semi-liquid state is transferred from the moving endless surfaces to the advancing fibre to form on the fibre a continuous coating of substantially uniform thickness.

The coated optical fibre emerging from between the endless surfaces preferably passes immediately through a curing oven or other apparatus for causing the hardenable material to harden.

Preferably the optical fibre is coated with hardenable material in tandem with, and downstream of, a fibre forming process; the speed of travel of the fibre preferably lies in the range 15 to 200 m/min.

The moving endless surfaces preferably are at substantially equal distances from the advancing optical fibre and are preferably spaced lengthwise in the direction of travel of the fibre.

At the positions at which hardenable material in a liquid or semi-liquid state is transferred from the moving endless surfaces to the advancing fibre, in most circumstances preferably the endless surfaces are travelling in the same direction as, and at a speed substantially greater than that of, the advancing fibre. However, where hardenable material in a liquid or semi-liquid state is being applied to an optical fibre emerging from fibre-forming apparatus and where the glass has a viscocity so low at the fibre-forming temperature and the hardenable material has a viscosity so high that the drag on the fibre exerted by the hardenable material exceeds the force needed to draw the fibre from the apparatus at the desired speed, preferably the endless surfaces are so driven that, at the positions at which hardenable material in a liquid or semi-liquid state is transferred from the moving endless surfaces to the advancing fibre, the endless surfaces are travelling in substantially the opposite direction to that of the optical fibre. In all cases, preferably the endless surfaces are travelling at the same speed as one another.

The apparatus for applying a coating of hardenable material to an advancing optical fibre by the method as hereinbefore described comprises two applicators each including a continuously moving endless surface, which endless surfaces define therebetween a path for the advancing optical fibre, means for driving the endless surfaces in such a direction that the parts of the endless surfaces adjacent the advancing optical fibre can be caused to travel in substantially the same direction as one another, and means for continuously applying hardenable material in a liquid or semi-liquid state to the endless surfaces of the applicators.

Preferably the applicators are spaced lengthwise in the direction of travel of the fibre and preferably also they are so transversely spaced that the parts of the endless surfaces that will be adjacent an advancing optical fibre lie on, or a short distance from, the axis of travel of the advancing fibre as it travels towards the first of the two applicators.

In a preferred embodiment the applicators comprise a pair of rotatably driven rollers whose axes are spaced lengthwise with respect to the direction of travel of the fibre and are so transversely spaced that a part of the circumferential surface of each roller lies on, or a short distance from, the axis of travel of an advancing fibre as it advances towards the first roller. The transverse spacing between the circumferential surfaces of the rollers is preferably adjustable to provide for applying coatings of hardenable material to optical fibres of diameters differing from one another. The two rollers are preferably of the same diameter and are preferably driven by the same drive means. The rollers are preferably arranged with their axes substantially horizontal.

Any convenient means may be employed for applying hardenable material in a liquid or semi-liquid state to each moving endless surface.

The method and apparatus of the present invention can be employed to apply to an advancing optical fibre a continuous coating of any known hardenable material than can be applied from solution or in melt form by means of an endless moving surface and such a coating may constitute an abrasion-resistant or buffer coating or, in some circumstances, it may constitute the cladding of an optical fibre of composite form. Hardenable materials that can be applied from solution include acrylic polyesters, silicone resins, polyurethanes, epoxy resins, polyesterimides, oil modified phenolic resins, polyimides and polyvinyl acetal type resins; hardenable materials that can be applied in melt form include solventless or substantially solvent-free resins of polyester, polyesterimide and polyurethane type, and materials that can be hardened by ultra-violet radiation such as resins dissolved in a reactive diluent. We prefer to employ as the hardenable material a thermosetting enamel that can be applied from solution whilst an optical fibre is travelling at a speed in the range 15 to 200 m/min. and that can be at least partially hardened in a few seconds at an elevated temperature, e.g. 200° to 400° C. Thermosetting enamels that are especially suitable include polyester imide resins such as that sold under the trademark "Terebec" by Dr. Beck & Co. (England) Ltd. and polyvinyl acetal type resins such as that sold under our Registered Trade Mark "Bicalex".

The invention also includes an optical fibre to which a layer of hardened material has been applied by the method hereinbefore described.

The invention is further illustrated by a description, by way of example, of a preferred apparatus for and method of applying a layer of hardenable thermosetting enamel to an advancing optical fibre, with reference to the accompanying drawing, in which:

FIGS. 1 and 2, respectively, are front and side elevations of the apparatus;

FIGS. 4 and 5 are fragmental front views of the apparatus showing alternative methods of applying thermosetting enamel in a liquid state to the surface of an applicator roller.

Figure 1:
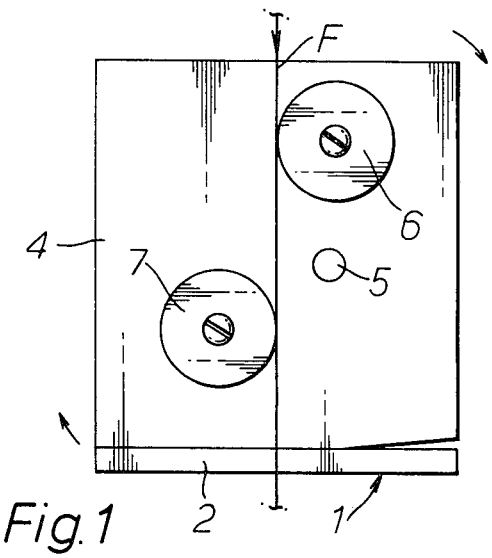
Figure 2:
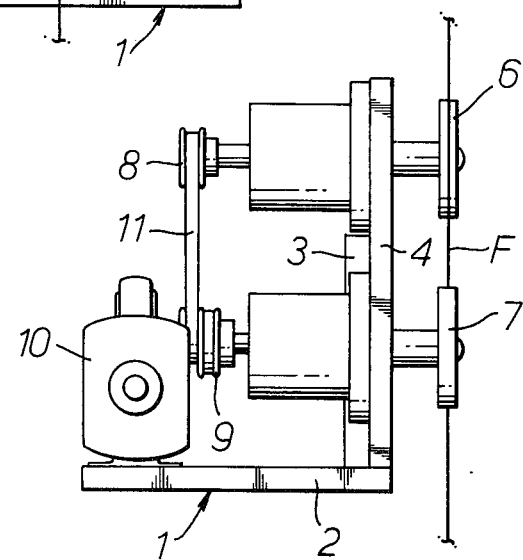
Figure 3:
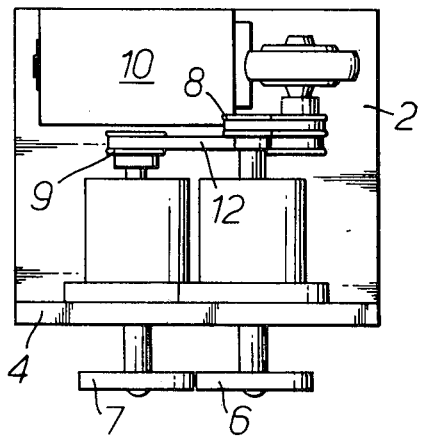
FIG. 3 is a plan view of the apparatus.

Referring to FIGS. 1 to 3, the apparatus comprises a support 1 comprising a base 2 and a vertical strut 3 on which a plate 4 is pivotally mounted at 5. Rotatably mounted on the plate 4 is a pair of applicator rollers 6 and 7 which are vertically spaced apart and are so transversely spaced that a part of the circumferential surface of each roller lies a short distance from and on opposite sides of a substantially vertical axis of travel of an advancing fibre F. The applicator rollers 6 and 7, respectively, have associated pulleys 8 and 9 which are rotatably driven by a common motor 10 through belts 11 and 12.

In normal operation of the apparatus, the support plate 4 is positioned on the support 1 as shown in FIG. 1 but, to facilitate threading an optical fibre through the apparatus at the start of a coating operation, the plate can be pivoted in a clockwise direction about the pivot 5 through an arc of approximately 5° to provide a sufficient gap between the applicator rollers 6 and 7 to enable an optical fibre to be threaded between the rollers with negligible risk of breaking the fibre.

Associated with each applicator roller 6, 7 is means by which thermosetting enamel in a liquid state can be applied to the surface of the roller. Two preferred devices for applying liquid thermosetting enamel to the surface of an applicator roller are shown in FIGS. 4 and 5.

In the device shown in FIG. 4, the applicator roller 6 is partially immersed in a body of liquid thermosetting enamel contained in a bath 15 and, on emerging from the bath, the enamel-coated surface of the roller passes a device 16 at which a doctor blade removes excess enamel.

In the device shown in FIG. 5, which is suitable for use when the roller 7 is rotating in either rotational direction, liquid thermosetting enamel is transferred from a bath 25 to the surface of the roller 7 by means of a train 26 of auxiliary rollers. A roller 27, which is partially immersed in the body of thermosetting enamel in the bath 25, transfers liquid enamel on its surface to a roller 28, and the roller 28 transfers liquid enamel on its surface to two rollers 29 and 30 which run on and transfer liquid enamel to the surface of the applicator roller 7.

What I claim as my invention is:

1. A method of applying a continuous coating of hardenable material to an advancing optical fibre which comprises causing an optical fibre advancing in the direction of its length to pass between two continuously moving endless surfaces which are positioned on opposite sides of the advancing fibre and each of which carries a layer of hardenable material in a liquefied state in such a way that the advancing optical fibre is at least partially immersed in each of said layers, the distance that each endless surface is spaced from the advancing optical fibre and the thickness of the layer of hardenable material on each endless surface being such that opposite parts of the advancing fibre pass through said layers of hardenable material with substantially no physical contact taking place between the fibre and the endless surfaces themselves, and driving the endless surfaces in such a direction and at such a speed having regard to the direction and speed of the advancing optical fibre that hardenable material in a liquefied state is transferred from the moving endless surfaces to the advancing fibre to form on the fibre continuous coating of substantially uniform thickness.

2. A method of applying a continuous coating of hardenable material to an advancing optical fibre which comprises causing an optical fibre advancing in the direction of its length to pass between two continuously moving endless surfaces which are positioned on opposite sides of the advancing fibre and are spaced lengthwise in the direction of its travel and each of which carries a layer of hardenable material in a liquefied state in such a way that the advancing optical fibre is at least partially immersed in each of said layers, the distance that each endless surface is spaced from the advancing optical fibre and the thickness of the layer of hardenable material on each endless surface being such that opposite parts of the advancing fibre pass through said layers of hardenable material with substantially no physical contact taking place between the fibre and the endless surfaces themselves, and driving the endless surfaces in such a direction and at such a speed having regard to the direction and speed of the advancing optical fibre that hardenable material in a liquefied state is transferred from the moving endless surfaces to the advancing fibre to form on the fibre a continuous coating of substantially uniform thickness.

3. A method as claimed in claim 1, wherein the moving endless surfaces are at substantially equal distances from the advancing optical fibre.

4. A method as claimed in claim 1, wherein the coated optical fibre emerging from between the endless surfaces passes immediately through apparatus for causing the hardenable material to harden.

5. A method as claimed in claim 1, wherein the optical fibre is coated with hardenable material in tandem with, and downstream of, a fibre-forming process.

6. A method as claimed in claim 5, wherein the endless surfaces are so driven that, at the positions at which hardenable material in a liquefied state is transferred from the moving endless surfaces to the advancing fibre, the endless surfaces are travelling in substantially the opposite direction to that of the optical fibre.

7. A method as claimed in claim 1, wherein, at the positions at which hardenable material in a liquefied state is transferred from the moving endless surfaces to the advancing fibre, the endless surfaces are travelling in the same direction as, and at a speed substantially greater than that of, the advancing fibre.

8. A method as claimed in claim 1, wherein the endless surfaces are travelling at the same speed as one another.

* * * * *